United States Patent
Edlein et al.

(10) Patent No.: US 6,677,014 B1
(45) Date of Patent: Jan. 13, 2004

(54) PRINTED ANTIFOG FILM WITH CELLULOSE ESTER INK OR OVERPRINT VARNISH

(75) Inventors: Marc Alan Edlein, Belton, SC (US); Joe Milton Bowen, Anderson, SC (US); Jean-Luc Foureys, Favieres (FR)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/407,929

(22) Filed: Sep. 28, 1999

(51) Int. Cl.$^7$ .......................... B41M 1/30; C09D 11/10
(52) U.S. Cl. ................. 428/35.7; 426/110; 426/127; 206/557; 525/54.21
(58) Field of Search ............... 428/35.7; 426/127, 426/110; 206/557; 525/54.21

(56) References Cited

U.S. PATENT DOCUMENTS

| | | | |
|---|---|---|---|
| 3,933,407 A | | 1/1976 | Tu et al. .................. 350/61 |
| 4,489,122 A | * | 12/1984 | Kammin et al. ............ 428/212 |
| 4,535,020 A | | 8/1985 | Thomas et al. ............ 428/131 |
| 5,019,202 A | | 5/1991 | Kawahata et al. .......... 156/277 |
| 5,375,701 A | * | 12/1994 | Hustad et al. ........... 206/45.18 |
| 5,407,708 A | | 4/1995 | Lovin et al. ................ 427/493 |
| 5,451,460 A | | 9/1995 | Lu et al. .................... 428/349 |
| 5,491,019 A | | 2/1996 | Kuo ............................ 428/213 |
| 5,523,136 A | | 6/1996 | Fischer et al. ............. 428/35.2 |
| 5,610,233 A | * | 3/1997 | Sharma .................... 525/54.21 |
| 5,741,901 A | * | 4/1998 | Cook et al. .................... 536/76 |
| 5,866,214 A | | 2/1999 | Ramesh .................... 428/34.8 |

FOREIGN PATENT DOCUMENTS

| | | |
|---|---|---|
| EP | 0 737 593 A2 | 10/1996 |
| JP | 58008643 A | 7/1981 |
| JP | 7118583 A | 10/1993 |
| WO | 97/04959 | 2/1997 |
| WO | WO 99/00250 | 1/1999 |
| WO | 00/47683 | 8/2000 |

OTHER PUBLICATIONS

Bekele, Jun. 26, 1997, WO 97/22655.*
Middleton, Printing And Converting, "The Right Cap Blend Gets Results".
Walker, "Formulation Guidelines For Cap In Liquid Inks".
Lazik, "The Manufacture Of Low–Odour Gravure–And Flexo–Printed Products" (Ipex 1984).
Eastman Chemical Company, "Eastman Cellulose Esters" (Publication E–146m, Aug. 1995).
Eastman Chemical Company, "Compatibility of Eastman Cellulose Acetate Butyrate/Cellulose Acetate Propionate and European Resins" (Publication E–309A, Jan. 1995).
Eastman Chemical Company, "Clear Overprints Based on CAP–482–0.5 and CAP–504–0.2 for Printed and Unprinted Stock" (Publication INK–20A, Jul. 1994).
Eastman Chemical Company, "Cellulose Acetate Propionate in Liquid Inks" (Publication INK–8B, Sep. 1998).

* cited by examiner

*Primary Examiner*—Harold Pyon
*Assistant Examiner*—Sow-Fun Hon
(74) *Attorney, Agent, or Firm*—Daniel B. Ruble

(57) ABSTRACT

A printed antifog packaging film incorporates one or more organic acid esters of cellulose to reduce the tendency of the film to form a ghost condensate image of the printed image after the film has been unwound from a roll form and subjected to conditions that form moisture condensation on the film. The organic acid ester of cellulose may be incorporated in the ink that forms the printed image or may be incorporated in an overprint varnish covering the printed image.

20 Claims, 1 Drawing Sheet

PRINTED ANTIFOG FILM WITH CELLULOSE ESTER INK OR OVERPRINT VARNISH

BACKGROUND OF THE INVENTION

The present invention relates to antifog films useful for packaging food, and more particularly to printed antifog films having an improved ability to maintain antifogging characteristics after being rolled.

Refrigerated food items are often displayed to consumers by resting the food item in a tray and covering the top of the tray with a transparent plastic film wrap. Typically, the food tray will have a perimeter lip extending above the stored food item so that the plastic film covering the top of the tray does not touch most of the packaged food. In this arrangement, the consumer may see clearly through the plastic wrap to view the food item stored in the package.

Upon refrigeration of a food item packaged in this manner, a "fog" may form on the inner, food-contact or food-side of the film, especially if the packaged food item has a high-moisture content. The term "fog" describes the collection of small moisture droplets that condense on the inner side of the film wrap. Unfortunately, these water droplets may cloud the inner surface of the film and thus obstruct or disrupt the view through the film—resulting in a negative consumer perception because of the inability to see clearly the packaged food through the plastic film wrap.

There have been several approaches to reduce the negative effects of fogging. One approach involves dispersing one or more antifog agents in the plastic film resin during processing of the film. Once in the film resin, the antifog agent tends to migrate to the surface of the film and raise the surface tension of the film. As a result, the water on the film inner side tends to form a relatively continuous film-like, transparent sheet of water rather than a fog.

Another approach to minimize the negative effects of fogging on a film involves applying an antifog coating directly to the plastic film's inner, food-side surface. Although this approach adds the expense of an additional coating step, it provides the benefit of applying the antifog agent to the film surface where it is most effective at reducing fogging.

A plastic film wrap typically includes printed regions on the film's outer surface to provide the consumer with visual information. The ink is printed to the outer, non-food side of the film to avoid contacting the packaged food with the print ink.

For the convenience of the packager, anti-fog packaging films are often supplied in pre-printed roll form. When the printed film is wound about a central core in progressive layers to form a roll, the printed side of the film contacts the non-printed side of film. This rolled arrangement causes surface contact between the film's printed outer side and the film's non-printed inner side. This contact appears to reduce the antifog effectiveness of the antifog film in the areas where the inner, food-side surface of the film has contacted the printed region of the film's outer surface.

As a result, when a packager unrolls a printed antifog film, wraps a food tray containing a food product, and refrigerates the packaged food product, a fog may form on the inner side of the film corresponding to the area of the inner surface that had been in contact with the printed region of the outer film surface when the film was rolled. Yet, where the film's inner surface area did not contact the printed regions when the film was rolled, the antifog film appears to function as designed—that is, reduces the formation of fog. The term "ghosting" refers to this contrast between transparent areas in which the antifog functions as designed and the opaque area in which a fog forms—because the fogged area on the film's inner surface may form a "ghost image" of the printed area on the film's outer surface.

SUMMARY OF THE INVENTION

The aforementioned problems are overcome in the present invention wherein a printed plastic antifog packaging film incorporates one or more organic acid esters of cellulose to reduce the tendency of the film to form a ghost condensate image of the printed image.

In a first aspect, the cellulose ester resin is incorporated in the ink that forms the printed image of the antifog packaging film. Accordingly, the printed packaging film includes an antifog film having first and second sides. At least the first side of the film has an antifogging characteristic. A printed image is on at least a portion of the second side of the film. The printed image includes an ink having an effective amount of one or more organic acid esters of cellulose.

In a second aspect of the invention, the cellulose ester resin is incorporated in an overprint varnish that covers the printed image of the antifog film. Accordingly, the printed packaging film includes a plastic film having first and second sides. At least the first side of the film has an antifogging characteristic. A printed image is on at least a portion of the second side of the film. An overprint varnish is on at least a substantial portion of the printed image. The overprint varnish includes an effective amount of one or more organic acid esters of cellulose.

The printed packaging film of the present invention presents several advantages. The film displays a reduced tendency for forming a ghost condensate image of the printed image after the film has been rewound to form a roll, and subsequently unwound for use in packaging that is exposed to conditions that form a moisture condensate on the film. The film thus provides a protective covering for a refrigerated packaged food item—for example, a refrigerated meat product on a tray—yet allows the consumer a pleasing, clear view of the stored food product without the disruption of a ghost condensate image. The printed antifog film may be manufactured using conventional equipment, for example either by including the cellulose ester resin in the ink layer that is applied in the final station of a print process or by including the cellulose ester resin in an overprint varnish that is applied in the final print station. The printed antifog film also displays excellent print adhesion and gloss properties.

These and other objects, advantages, and features of the invention will be more readily understood and appreciated by reference to the detailed description of the invention and the drawings.

DETAILED DESCRIPTION OF THE INVENTION

Figure 1:
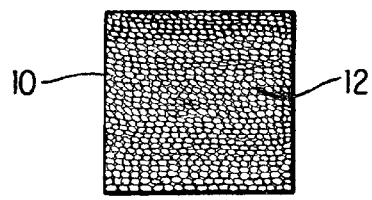
FIG. 1 is an actual-size plan view of a film having an Antifog Rating of 1.
Figure 2:
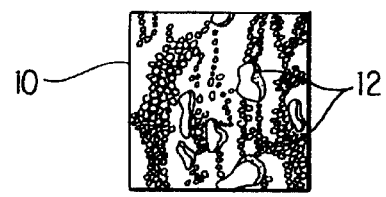
FIG. 2 is an actual-size plan view of a film having an Antifog Rating of 2.
Figure 3:
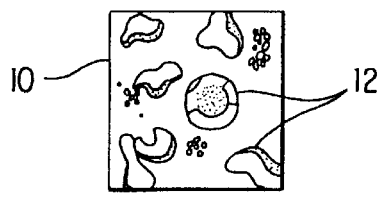
FIG. 3 is an actual-size plan view of a film having an Antifog Rating of 3.
Figure 4:
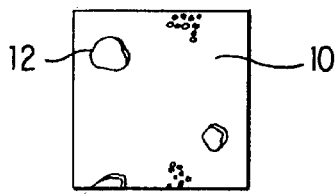
FIG. 4 is an actual-size plan view of a film having an Antifog Rating of 4.
Figure 5:
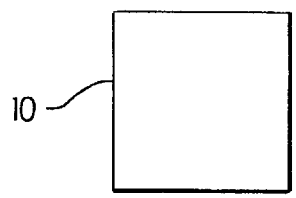
FIG. 5 is an actual-size plan view of a film having an Antifog Rating of 5.

The antifog film of the present invention incorporates at least one of an ink system or an overprint varnish that include one or more organic acid esters of cellulose.

Antifog Film

The term "antifog film" means a plastic film whose surface properties have been modified or adapted to have antifog characteristics—that is, a tendency to reduce or minimize the negative effects of moisture condensation. For example, an antifog film may incorporate or disperse in effective amounts one or more antifog agents in the plastic film resin before forming the resin into a film. The film may be multilayered (as discussed below), in which case the antifog agent may be incorporated in one or more of the layers of the film, preferably in one or more of the outer layers of the film. Further, the antifog agent may be absent from (i.e., not incorporated in) one or more (or all) of the internal layers of the film. Preferably, at least one layer of the multilayered antifog film does not incorporate an antifog agent. Effective amounts of antifog agent in a film layer include (in ascending order of preference) from about 0.5% to about 12%, from about 1% to about 10%, from about 1.5% to about 8%, and from about 2% to about 6%, based on the total weight of the layer.

Antifog agents are known in the art, and fall into classes such as esters of aliphatic alcohols, polyethers, polyhydric alcohols, esters of polyhydric aliphatic alcohols, polyethoxylated aromatic alcohols, nonionic ethoxylates, and hydrophilic fatty acid esters. Antifog agents include polyoxyethylene, sorbitan monostearate, polyoxyethylene sorbitan monolaurate, polyoxyethylene monopalmitate, polyoxyethylene sorbitan tristearate, polyoxyethylene sorbitan trioleate, poly(oxypropylene), polyethoxylated fatty alcohols, polyoxyethylated 4-nonylphenol, polyhydric alcohol, propylene diol, propylene triol, and ethylene diol, monoglyceride esters of vegetable oil or animal fat, mono- and/or diglycerides such as glycerol mono- and dioleate, glyceryl stearate, monophenyl polyethoxylate, and sorbitan monolaurate.

An antifog film may also be formed by applying to at least one surface of the film an antifog coating that contains in an effective amount one or more antifog agents. See, for example, U.S. Pat. No. 5,451,460 to Lu issued Sep. 19, 1995 entitled "Plastic Films with Surface Anti-Fog Properties" and International Publication No. WO/99/00250 published Jan. 7, 1999 entitled "Fog-Resistant Packaging Film," each of which is incorporated herein in its entirety by reference. The antifog coating is typically applied to one side of the film—the food side—not only to save cost in coating material, but also to avoid coating the non-food side of the film with an agent that may reduce the adhesion of the ink that will be printed on the non-food side.

The antifog film may include any plastic material, such as a thermoplastic, that is suitable for packaging food products. Useful plastics include homopolymers, copolymers, terpolymers, and the like of polyolefins, polyamides, polyesters, polyvinyls, polystyrenes, polyurethanes, polycarbonates, including polymers such as ethylene/vinyl alcohol copolymers (EVOH), polyvinylidene chlorides, polyalkylene carbonates, and starch-containing polymers. Terms identifying polymers, such as "polyamide", "polyester", and "polyurethane" are inclusive of not only polymers comprising repeating units derived from monomers known to polymerize to form a polymer of the named type, but are also inclusive of comonomers and derivatives, which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of mixtures and blends of such polymers with other polymers of a different type.

"Polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/unsaturated ester copolymer, ethylene/unsaturated acid copolymer (e.g., ethyl acrylate copolymer, ethylene/butyl acrylate copolymer, ethylene/methyl acrylate copolymer, ethylene/acrylic acid copolymer, ethylene/methacrylic acid copolymer), modified polyolefin resin, ionomer resin, and polymethylpentene. Modified polyolefin resin is inclusive of modified polymer prepared by copolymerizing the homopolymer of the olefin or copolymer thereof with an unsaturated carboxylic acid (e.g., maleic acid, fumaric acid or the like) or a derivative thereof such as the anhydride, ester or metal salt or the like. It could also be obtained by incorporating into the olefin homopolymer or copolymer, an unsaturated carboxylic acid or a derivative thereof.

EVOH includes saponified or hydrolyzed ethylene/vinyl acetate copolymers, and refers to a vinyl alcohol copolymer having an ethylene comonomer, and prepared by, for example, hydrolysis of vinyl acetate copolymers, or by chemical reactions with polyvinyl alcohol.

"Ethylene alpha-olefin copolymer" and "ethylene/alpha-olefin copolymer" refer to the polymers generally prepared by the copolymerization of ethylene and one or more alpha-olefins. Ethylene/alpha-olefin copolymers include copolymers resulting from the copolymerization of from about 80 to about 99 weight percent ethylene and from 1 to about 20 weight percent alpha-olefin. Preferably, the ethylene/alpha-olefin copolymer comprises a copolymer resulting from the copolymerization of from about 85 to about 95 weight percent ethylene and from about 5 to about 15 weight percent alpha-olefin. Ethylene alpha-olefin copolymers include: i) heterogeneous materials (i.e., having a relatively wide variation in molecular weight and composition distribution), such as linear low density polyethylene (LLDPE), and very low and ultra low density polyethylene (VLDPE and ULDPE), and ii) homogeneous polymers (i.e., having a relatively narrow molecular weight and composition distribution, typically prepared using metallocene or other single site-type catalysts), such as metallocene-catalyzed linear homogeneous ethylene/alpha olefin copolymer resins, which generally include copolymers of ethylene with one or more comonomers selected from $C_4$ to $C_{10}$ alpha-olefin such as butene-1 (i.e., 1-butene), hexene-1, and octene-1, in which the molecules of the copolymers comprise long chains with relatively few side chain branches or cross-linked structures. This molecular structure is to be contrasted with conventional low or medium density polyethylenes which are more highly branched than their respective counterparts.

Preferably, the film is transparent so that the packaged food item is visible through the film. "Transparent" as used herein means that the material transmits incident light with negligible scattering and little absorption, enabling objects (e.g., packaged food or print) to be seen clearly through the material under typical viewing conditions (i.e., the expected use conditions of the material).

The antifog film may include multiple layers of the same or different plastics in order to vary the physical properties of the film according to the desired end use. Preferably, the antifog film includes from 1 to 20 layers, more preferably from 2 to 12 layers, even more preferably from 2 to 9 layers, most preferably from 3 to 8 layers. For example, the film can include a barrier layer incorporating a polymer—such as ethylene vinyl alcohol copolymer (EVOH), polyvinylidene chloride (PVDC), polyalkylene carbonate, polyamide, or polyester—having low permeance to oxygen. Preferably, any barrier layer is an inner layer of the film. The film may also include one or more bulk layers and abuse layers. Also, a multiple layer film may include one or more tie layers to provide increased adherence between the other layers. Exemplary polymers used in tie, bulk, and abuse layers include polyolefins, polystyrenes, polyamides, polyesters, and polyurethane.

Various combinations of layers can be used in the formation of multilayer films. Only 2- through 9-layer embodiments are provided here for illustrative purposes; however, a film according to the present invention may include more layers. Given below are some examples of combinations in which letters are used to represent film layers:

A/A', A/B, A/C, A/B/A, A/B/C, A/B/D, A/C/A, A/A'/A", A/B/C/A,
A/B/C/D, A/C/B/C/A, A/C/C'/C/A, A/C/B/C/A, A/C/D/C/A,
A/B/C/D/A, A/D/B/A, A/B/C/D/C', A/B/D/C, A/B/D/C/D, A/C/
B/D, A/D/C/D, A/B/D/C/C', D/C/D/C/D/C/A, D/C/D/C/A, D/C/
A/C/D/B/D/C/A, A/C/D/B/D/C/A in which A, A', and A" represent layers that each independently include a polymer including mer units derived from ethylene; B represents a layer including a polymer having a low permeance to oxygen; C and C' represent layers that each independently include one or more polymers that include mer units derived from at least one of a $C_2$–$C_{12}$ α-olefin, styrene, amide, ester, or urethane; and D represents a layer including a polyester or polyamide. One or more tie layers can be used in any of the above structures. Examples of useful plastics and multilayer films are also described in U.S. Pat. No. 5,523,136 to Fischer et al; U.S. Pat. No. 5,866,214 to Ramesh; and U.S. Pat. No. 5,491,019 to Kuo; and International Publication No. WO 97/28964, each of which is incorporated herein in its entirety by reference. The outer layer of the antifog film may be of a composition adapted for heat sealing the antifog film to itself or another structure.

The antifog film may include one or more polyolefins in an amount (in ascending order of preference) of at least 20%, at least 40%, at least 50%, at least 60%, at least 65%, at least 70%, at least 75%, at least 80%, at least 85%, at least 90%, and at least 95% based on the weight of the total film. One or more of the outer layers of a multilayered antifog film may include one or more polyolefins in an amount (in ascending order of preference) of at least 10%, at least 20%, at least 40%, at least 50%, at least 60%, at least 65%, at least 70%, at least 75%, at least 80%, at least 85%, at least 90%, and at least 95% based on the weight of the layer.

The antifog film may also include one or more additives useful in packaging films, such as, antiblocking agents, slip agents, colorants, flavorants, antimicrobial agents, and meat preservatives, as is known in the art. One or more of the layers of the antifog film may include polymers that have been cross-linked. For example, the antifog film may be irradiated (e.g., a high energy electron treatment) to alter the surface of the film and/or induce crosslinking between molecules of the resin polymers. The film may be exposed to radiation dosages of at least 5, preferably at least 7, more preferably at least 10, most preferably at least 15 kGy (kilograys). The radiation dosage may also range from 5 to 150, more preferably from 5 to 100, and most preferably from 5 to 75 kGy.

The antifog film may be non-heat shrinkable or oriented to provide heat-shrink capabilities. Preferably, a heat-shrinkable antifog film exhibits a shrink tension in at least one direction of at least about 0.33 MPa, more preferably from about 0.67 MPa to about 3.5 MPa. More preferably, the heat shrinkable film exhibits these properties biaxially. At about 85° C., the antifog film preferably has a free shrink in at least one direction of (in ascending order of preference) at least about 5%, at least about 10%, at least about 15%, at least about 20%, at least about 25%, at least about 30%, and at least about 35%. The free shrink may be measured as set forth in ASTM D2732. Further, the antifog film may have a heat shrink characteristic in both directions of less than 5%.

The antifog film may be of any thickness appropriate for providing the desired physical properties (e.g., optics, elasticity, resilience, strength) for the desired packaging application. Preferably, the antifog film has a total thickness of (in ascending order of preference) from 0.0075 to 0.25 mm, from 0.0125 to 0.125 mm, from 0.0125 to 0.075 mm, from 0.015 to 0.05 mm, from 0.015 to 0.04 mm, and from 0.015 to 0.03 mm.

The antifog effectiveness of an antifog film may be assigned a numerical value ("Antifog Rating") by visually comparing a sample film, which has been exposed to controlled fogging conditions, to reference standards (FIGS. 1–5) showing varying amounts and sizes of moisture condensate droplets on a film. The controlled fogging conditions are as follows. The sample film is secured over a mason jar that has about 10% of its internal volume filled with water at room temperature. The sealed jar is then placed in a refrigerator at 45° F. (7° C.). After 24 hours, the sealed jar is removed. The exposed sample film is visually compared to FIGS. 1–5 and assigned the Antifog Rating corresponding to the Figure that most closely resembles the appearance of the exposed sample film.

Referring to the drawings, FIG. 1 shows the representative concentration and size of moisture condensate droplets 12 on a 1 inch by 1 inch (25.4 mm by 25.4 mm) representative film section 10. FIG. 1 has an Antifog Rating of 1. In a similar manner, FIGS. 2–5 show the representative concentration and size of moisture condensate droplets 12 on the film 10, and have Antifog Ratings of 2 through 5, respectively. The film 10 of FIG. 1 essentially lacks antifog characteristics; whereas, the film 10 of FIG. 5 has excellent antifog characteristics. The effectiveness of the antifog increases as the Antifog Rating increases from 1 to 5.

Ink System

A printed image is applied to the antifog film, preferably to the non-food side of the film. To form the printed image, one or more layers of ink are printed on the film. The ink is selected to have acceptable ink adhesion, gloss, and heat resistance once printed on the film substrate. Acceptable ink adhesions include (in ascending order of preference) at least 50%, at least 60%, at least 70%, at least 80%, at least 90%, and at least 95%, as measured by ASTM D3359-93, as adapted by those of skill in the film print art. The ink is preferably applied to the non-food side of the film in order to avoid contact of the packaged food with the ink. If the film is multilayered, the ink is preferably applied to the external or outer layer of the film.

Solvent-based inks for use in printing packaging films include a colorant (e.g., pigment) dispersed in a vehicle that typically incorporates a resin (e.g., nitrocellulose, polyamide), a solvent (e.g., an alcohol), and optional additives. Inks and processes for printing on plastic films are known to those of skill in the art. See, for example, Leach & Pierce, The Printing Ink Manual (5$^{th}$ ed. 1993), which is incorporated herein in its entirety by reference.

Examples of pigments and dyes that may be dispersed in ink resin include 4B Toner (PR57), 2B Toner (PR48), Lake Red C (PR53), lithol red (PR49), iron oxide (PR101), Permanent Red R (PR4), Permanent Red 2G (PO5), pyrazolone orange (PO13), diaryl yellows (PY12,13,14), monoazo yellows (PY3,5,98), phthalocyanine green (PG7), phthalocyanine Blue, β form (PB15), ultramarine (PB62), permanent violet (PV23), titanium dioxide (PW6), carbon black (furnace/channel) (PB7), PMTA pink, green, blue, violet (PR81, PG1, PB1, PV3,), and copper ferrocyanide dye complexes (PR169, PG45, PB62, PV27). (Parenthetical identifications in the foregoing refer to the generic color index prepared by the Society of Dyers and Colourists.)

Examples of ink resins include those which have nitrocellulose, amide, urethane, epoxide, acrylate, and/or ester functionalities. Ink resins include one or more of nitrocellulose, polyamide, polyurethane, ethyl cellulose, (meth)acrylates, poly(vinyl butyral), poly(vinyl acetate), poly(vinyl chloride), and polyethylene terephthalate (PET). Ink resins may be blended, for example, as nitrocellulose/polyamide blends (NC/PA) or nitrocellulose/polyurethane blends (NC/PU).

Examples of ink solvents include one or more of water, alcohols (e.g., ethanol, 1-propanol, isopropanol), acetates (e.g., n-propyl acetate), aliphatic hydrocarbons, aromatic hydrocarbons (e.g., toluene), and ketones. The solvent may be incorporated in an amount sufficient to provide inks having viscosities, as measured on a #2 Zahn cup as known in the art, of at least about 15 seconds, preferably of at least about 20 seconds, more preferably of at least about 25 seconds, even more preferably of from about 25 to about 45 seconds, and most preferably from about 25 to about 35 seconds.

Once a solvent-based ink is applied to the film, the solvent evaporates, leaving behind the resin-pigment combination. The solvent may evaporate as a result of heat or forced air exposure to speed drying. The ink may be applied in layers, each with a different color, to provide the desired effect. For example, a printing system may employ eight print stations, each station with a different color ink. Optionally, the last (e.g., eighth) print station may be used to apply an overprint varnish (discussed below).

To improve the adhesion of the ink to the surface of the antifog film, the surface of the film may be treated or modified before printing. Surface treatments and modifications include: i) mechanical treatments, such as corona treatment, plasma treatment, and flame treatment, and ii) primer treatment. Surface treatments and modifications are known to those of skill in the art. The flame treatment is less desirable for a heat-shrinkable film, since heat may prematurely shrink the film. The primer may be based on any of the ink resins previously discussed, preferably an ethylene vinyl acetate polymer (EVA) resin. The ink on the printed film should withstand without diminished performance the temperature ranges to which it will be exposed during packaging and use. For example, the ink preferably withstands a freezer or refrigerated environment, such as temperatures of at least −15° C., preferably at least 0° C., more preferably at least 20° C. Also, the ink on the printed film preferably withstands physical and thermal abuse (e.g., heat sealing) during packaging end-use, such as at temperatures of (in ascending order of preference) 100° C., 125° C., 150° C., and 175° C. for 3 seconds, more preferably 5 seconds, and most preferably 8 seconds.

Ink Containing Organic Acid Esters of Cellulose

In a first aspect of the invention, the printed image on the antifog film includes at least one layer of an ink having a resin system that includes one or more organic acid esters of cellulose. Preferably, at least the outermost ink layer includes the cellulose ester resin. The organic acid ester of cellulose is selected to be compatible with the other resins (if any) in the ink system and the resins of the film substrate. The compatibility of cellulose esters is described by Eastman Chemical Company, "Compatibility of Eastman Cellulose Acetate Butyrate/Cellulose Acetate Propionate and European Resins" (Publication E-309A, January 1995), which is incorporated herein in its entirety by this reference.

The organic acid esters of cellulose include cellulose esters containing acyl moieties selected from the group consisting of the C2 to C6 organic acids, and mixtures thereof, preferably the C2 to C4 organic acids, and mixtures thereof. Preferably, the organic acid ester of cellulose is a mixed cellulose ester, that is, one that includes at least two different acyl groups, for example, selected from the acyl groups consisting of acetyl, propionyl, and butyryl, more preferably with one of the acyl moieties being acetyl and another being either propionyl or butyryl.

The properties (e.g., viscosity) of organic acid esters of cellulose that contain one acyl group depend on several factors, such as the degree of esterification of the cellulose and the molecular weight. A useful organic acid ester of cellulose that contains one acyl group is cellulose acetate (CA). The degree of esterification of CA may be characterized by the average acetyl content of the ester as weight percent. The average acetyl content of CA may range from, for example, about 35 to about 45 weight %, more preferably from about 38 to about 42 weight %. The average molecular weight may range from, for example, about 25,000 to about 65,000, more preferably from about 35,000 to about 55,000. The viscosity (ASTM D 817, formula A, and ASTM D 1343) of CA may range, for example, from about 10 to about 250 poise, preferably from about 10 to about 40 poise. CA is soluble in strong solvents such as acetone, methyl ethyl ketone, and ethyl acetate.

The properties of mixed cellulose esters (i.e., organic acid esters of cellulose that contain at least two different acyl groups) depend on several factors, including the relative amount of the different acyl groups, the degree of esterification of the cellulose, and the molecular weight. Examples of useful mixed organic acid esters of cellulose include cellulose acetate butyrate (CAB) and cellulose acetate propionate (CAP). Preferably, the organic acid ester of cellulose is CAP.

CAB may have varying proportions of acetyl to butyryl groups. Generally, an increase in the butyryl groups increases the flexibility, moisture resistance, solubility, and resin compatibility of CAB, but lowers the softening point and hardness. The average butyryl content of CAB may vary, for example, from about 15 to about 60 weight %, preferably from about 25 to about 55 weight %, and more preferably from about 35 to about 45 weight %. The corresponding average acetyl content may range, for example, from about 1 to about 35 weight %, preferably from about 2 to about 30 weight %, more preferably from about 10 to 20 weight %. For a given hydroxyl content level, as the butyryl content increases, the acetyl content will decrease a corresponding amount. The hydroxyl content of CAB may range, for example, from about 0.5 to about 5 weight %, preferably from about 0.7 to about 2 weight %. The degree of esterification of CAB may also be characterized by the approximate number of hydroxyl groups per four anhydroglucose units in the cellulose ester chain. Preferably, the hydroxyl content is about 1 hydroxyl group per four anhydroglucose units. The average molecular weight of CAB may range, for example, from about 10,000 to about 80,000, preferably from about 20,000 to about 70,000, more preferably from about 30,000 to about 50,000. The viscosity (ASTM D 817, formula A, and ASTM D 1343) of CAB may range, for example, from about 0.03 to about 80 poise, preferably from about 0.3 to about 20 poise, more preferably from about 2 to 10 poise.

CAP may have varying proportions of acetyl to propionyl groups. Similar to CAB, an increase in the propionyl groups increases the flexibility, moisture resistance, solubility, and resin compatibility of CAP, but lowers the softening point and hardness. The average propionyl content of CAP may vary, for example, from about 35 to about 55 weight %, preferably from about 40 to about 50 weight %, and more preferably from about 42 to about 46 weight %. The corresponding average acetyl content may range, for example, from about 0.3 to about 3 weight %, preferably from about 2 to about 2.6 weight %, more preferably about 2 weight %. For a given hydroxyl content level, as the propionyl content increases, the acetyl content will decrease a corresponding amount. The hydroxyl content of CAP may range, for example, from about 1 to about 10 weight %, preferably from about 1.5 to about 6 weight %. The degree of esterification of CAP may also be characterized by the approximate number of hydroxyl groups per four anhydroglucose units in the cellulose ester chain. Preferably, the hydroxyl content is about 1 hydroxyl group per four anhydroglucose units. The average molecular weight of CAP may range, for example, from about 10,000 to about 80,000, preferably from about 10,000 to about 30,000, more preferably from about 15,000 to about 25,000. The viscosity (ASTM D 817, formula A, and ASTM D 1343) of CAP may range, for example, from about 0.5 to about 80 poise, preferably from about 0.7 to about 20 poise, more preferably from about 2 to 10 poise. The incorporation of CAP in ink is discussed in Eastman Chemical Company, "Cellulose Acetate Propionate in Liquid Inks" (Publication INK-8B, September 1998), which is incorporated in its entirety herein by reference.

For this first aspect of the invention, the ink includes one or more organic acid esters of cellulose in an amount effective to reduce the ghosting that occurs when a comparable ink system does not incorporate an organic acid ester of cellulose. Effective amounts of cellulose ester in the ink may be characterized as a weight percentage of the total resin in the ink. Effective amounts of cellulose ester in the ink resin include (in ascending order of preference) at least 1%, at least 3%, at least 5%, and at least 10%—as well as less than 40%, less than 60%, less than 80%, less than 90%, less than 99%, and 100%. Effective ranges of cellulose ester in the ink resin include (in ascending order of preference) from 1 to 20%, from 1 to 40%, from 5 to 90%, from 10 to 80%, from 20 to 70%, and from 30 to 60%. Inks that incorporate organic acid esters of cellulose include inks sold by BASF Corporation under the VINYLSTAR B-12 trademark and by Coates Lorilleux International under the LIBRA trademark, each of which incorporate CAP. CAP resin may be used with any of the ink resins previously discussed. Preferably, the antifogging characteristic of the printed antifog film is substantially maintained after the film has been rewound. "Substantially maintained" in this context means that after the film has been rolled and unrolled, the film does not display noticeable ghosting and the ability of the film to reduce fogging is within 90% of its pre-rolled capability.

Overprint Varnish

A pigment-free overcoat or overprint varnish may be applied to the printed side of the antifog film, preferably covering the printed portion of the film. The overprint varnish may enhance the print or perform a desired result, such as increasing the resistance performance of the print, as is known in the art. Preferably, the overprint varnish is transparent. Also preferably, the overprint varnish has a viscosity such that it can be printed or applied in a similar manner as solvent-based inks.

The overprint varnish is applied in a thickness effective to provide the desired scratch resistance (during film handling and processing) and/or chemical resistance (e.g., to fatty acids, oils, processing aids). However, the overprint varnish thickness should be thin enough not to restrict the film substrate from shrinking or flexing with the film substrate as required by the desired application. Useful overprint varnish thicknesses include from about 0.1 to about 12 $\mu$m, preferably from about 0.5 to about 10 $\mu$m, more preferably from about 1.0 to about 8 $\mu$m, and most preferably from about 1.5 to about 5 $\mu$m.

Overprint Varnish of Organic Acid Esters of Cellulose

In a second aspect of the present invention, the printed antifog film includes an overprint varnish that incorporates a resin system of one or more organic acid esters. The overprint varnish of cellulose ester may be applied over the printed image that includes either an ink system that is free of a resin of an organic acid ester of cellulose or an ink system that includes an organic acid ester of cellulose. Useful organic acid esters of cellulose for overprint varnish application are those discussed above in association with ink systems. Generally, overprint varnish compositions may be similar to ink system compositions—except without the colorant (e.g., pigment) incorporated in the ink system. Preferably, the overprint varnish covers a substantial portion of the printed image. "Substantial portion" in this context means that the overprint varnish covers a sufficient portion of the printed image so that the antifogging characteristic of the printed antifog film is substantially maintained after the film has been rewound.

Preferably, the overprint varnish includes an amount of organic acid ester of cellulose that is effective to reduce the ghosting that occurs when a comparable printed antifog film does not include an overprint varnish incorporating an organic acid ester of cellulose. Effective amounts of cellulose ester in the overprint varnish may be characterized as a weight percentage of the total resin in the overprint varnish. Effective amounts of cellulose ester in the overprint varnish include (in ascending order of preference) at least 1%, at least 3%, at least 5%, and at least 10%—as well as less than 40%, less than 60%, less than 80%, less than 90%, less than 99%, and 100%. Effective ranges of cellulose ester in the overprint varnish include (in ascending order of preference) from 1 to 20%, from 1 to 40%, from 5 to 90%, from 10 to 80%, from 20 to 70%, and from 30 to 60%. Overprint varnishes that incorporate organic acid esters of cellulose include those sold by BASF under the VINYLSTAR B-12 trademark and by Coates Lorilleux International under the LIBRA trademark, each of which incorporate CAP. The use of an overprint varnish incorporating CAP is discussed in Eastman Chemical Company, "Clear Overprints Based on CAP-482-0.5 and CAP-504-0.2 for Printed and Unprinted Stock" (Publication INK-20A, July 1994), which is incorporated herein in its entirety by reference.

Manufacture of the Printed Antifog Film

The antifog film of the present invention may be manufactured by a variety of processes known in the art, including extrusion (e.g., blown-film extrusion, coextrusion, extrusion coating, free film extrusion, and lamination) and casting. If the antifog film includes multiple layers, then preferably at least one internal layer is extruded without incorporating an antifog agent. The organic acid esters of cellulose may be incorporated in the ink or overprint varnish along with any other resins (if any) using ink and overprint varnish manufacturing techniques known to those of skill in the art.

The printed image is applied to the antifog film by printing the ink on the outer non-food side of the film. Preferably a primer is applied to the antifog film before the application of an ink having a resin of one or more organic acid esters of cellulose. The antifog film may be printed by any suitable method, such as rotary screen, gravure, or flexographic techniques, as is known in the art. After the ink is applied to the antifog film, the ink may be dried or cured by solvent evaporation through exposure to air and/or heat.

The overprint varnish may be applied by any of the techniques known in the art, including screen, gravure, and flexographic print techniques, and by in-line, stack, and central impression configurations. The application of the overprint varnish may occur by an off-line coating station using the above techniques, but preferably occurs in-line with application of the ink.

After manufacture, the printed anti-fog packaging film is preferably wound about a central core in progressive layers to form a roll.

Use of the Printed Antifog Film

The printed antifog film of the present invention may be used to package a variety of products, preferably food products such as poultry (e.g., turkey or chicken breast), bologna, braunschweiger, beef (including whole muscle products such as roast beef), pork, lamb, and other meat products, cheese, and produce such as cut and uncut lettuce, carrots, radish, and celery, and more preferably food products that have a moisture content tending to cause fogging on plastic used to package the product.

As is known in the art, a food product may be characterized by its "water activity" ($A_w$), which is the ratio of the water vapor pressure above the food product to the vapor pressure of pure water at the same temperature. Thus, the $A_w$ numerically represents the relationship of the free water in a food product to the amount of water vapor in the atmosphere around the food product. The $A_w$ value may range from 1.0 for pure water to 0.0 for a complete absence of free water. The printed antifog film is preferably used to package a food product having an $A_w$ of greater than 0.5, more preferably greater than 0.8, even more preferably greater than 0.85, still more preferably greater than 0.90, and most preferably greater than 0.95.

If the printed antifog film is provided in a roll form, then the packager unrolls the film as needed for the packaging application. A bag for packaging the food product may be made from the printed antifog film by sealing the outer layer to itself in a selected region, as is known in the art. Useful bags include an end-seal bag, a side-seal bag, an L-seal bag (i.e., sealed across the bottom and along one side with an open top), or a pouch (i.e., sealed on three sides with an open top). Additionally, lap seals may be employed. After forming the bag, the product may be inserted into the bag, and the open end of the bag sealed to enclose the product.

The printed antifog film may also be wrapped around a product and heat sealed to form a package enclosing the product. If the printed antifog film is formed of a heat-shrinkable film, the resulting bag may be heated to shrink the film around the product.

The printed antifog film may also be used as a transparent wrap to cover and secure a food product that rests on a tray—that is, the film may be used as a tray overwrap. The printed antifog film may be adapted for use as a complete tray overwrap—namely, where the film is capable of completely covering the packaged food product and adhering or clinging to itself to complete the packaging closure. Further, the printed antifog film may be adapted for use as a lid-seal overwrap, in which case the film is adapted for adhering, sealing, or clinging to the tray to complete the packaging closure. In the lid-seal application, the printed antifog film may be exposed to heat associated with a film heat-seal operation. In such a case, the printed image of the antifog film includes an ink that is preferably capable of withstanding the temperature exposure associated with the heat seal, since the seal may contact the printed image area of the film.

The tray upon which the food product rests typically includes a perimeter lip that extends above the base of the tray, as is known in the art. Preferably, the perimeter lip extends sufficiently so that the printed antifog film as a tray overwrap does not contact a substantial portion of the food product being packaged on the tray. "Substantial portion" in this context means that the film does not contact at least 60% of the food product surface area that is visible from the top view, more preferably at least 80%, and most preferably does not contact the food product at all. Where the printed antifog film does not contact the food product as an overwrap, the film may be spaced from the packaged food product by (in ascending order of preference) at at least 1 mm, at least 3 mm, at least 5 mm, at least 7 mm, at least 10 mm, at least 15 mm, and at least 20 mm.

The printed antifog film may be capable of reducing or minimizing the ghosting storage of a food product at less than 50° F. (10° C.), preferably at less than 40° F. (4.4° C.) for at least 5 minutes, preferably for at least 10 minutes, more preferably at least 15 minutes, and most preferably for at least 20 minutes.

The following examples are presented for the purpose of further illustrating and explaining the present invention and are not to be taken as limiting in any regard. Unless otherwise indicated, all parts and percentages are by weight.

EXAMPLE 1

A #4 Myar rod was used to apply each of the inks identified in the chart below to one side of separate, equivalent plastic film samples—namely, 0.75 mil (0.019 mm) thick, balanced five-layer, heat-shrinkable polyolefin antifog films.

| Sample No | Ink Tradename | Ink Manufacturer | Ink Resin | Antifog Rating |
|---|---|---|---|---|
| 1 | GRANADA | Coates Lorilleux International (UK) | NC/PA | 1 |
| 2 | SUNSHRINK | Sun Chemical Ink (GPI) (USA) | NC/PA | 1 |
| 3 | DPH 901 | Sun Chemical Ink (GPI) | NC/PU | 1 |

-continued

| Sample No | Ink Tradename | Ink Manufacturer | Ink Resin | Antifog Rating |
|---|---|---|---|---|
| 4 | THERMO-SURF | Sun Chemical Ink (GPI) (USA) | NC/PU | 1 |
| 5 | ULTRALAM | Sun Chemical Ink (GPI) (USA) | Polyvinyl Bytyral | 1 |
| 6 | SUN-X | Sun Chemical Ink (GPI) (USA) | Acrylic | 2 |
| 7 | SUNESTER | Sun Chemical Ink (GPI) (USA) | PET | 2 |
| 8 | PYROFLEX | Sun Chemical Ink (GPI) (USA) | NC/PU | 1 |
| 9 | BBV | Sun Chemical Ink (GPI) (USA) | NC/PA | 1 |
| 10 | ULTRABOND | Sun Chemical Ink (GPI) (USA) | NC/PA | 1 |
| 11 | VINYLSTAR B-12 | BASF Systeme d'Impression (France) | CAP | 5 |
| 12 | LIBRA | Coates Lorilleux International (UK) | CAP | 5 |

The outer layers of the film were made of ethylene/α-olefin copolymers and included about 3% antifog agents of mono- and di-glycerides and polyethoxylated fatty alcohols. The resulting printed antifog film samples had a printed side and a non-printed side. The printed side of each film sample was placed against an equivalent film sample that was not printed. The resulting composite was subjected to sufficient pressure to simulate storage in a roll form. The films forming the composite were then separated. The Antifog Rating for the side of the unprinted film sample that had been compressed against the printed side of the corresponding printed film sample was determined, using the method for determining the Antifog Rating as discussed in the Antifog Film section above. Samples 1–10, which were compressed against the print side of film samples incorporating ink that did not include a CAP resin, demonstrated significantly deteriorated antifogging characteristics, as shown by the Antifog Ratings of 1. However, samples 11–12, which were compressed against the print side of film samples that included ink that did incorporate a CAP resin, did not demonstrate any significant deterioration of antifog characteristics, as shown by the Antifog Ratings of 5.

EXAMPLE 2

A #4 Myar rod was used to apply a white solvent-based ink having an ink resin of NC/PA (GRANADA WHITE brand ink available from Coates Lorilleux International) to one side of a 0.75 mil (0.019 mm) thick, balanced five-layer, heat-shrinkable polyolefin antifog film. The outer layers of the film were made of ethylene/α-olefin copolymers and included about 3% antifog agents of mono- and di-glycerides and polyethoxylated fatty alcohols. The resulting printed antifog film sample had a printed side and a non-printed side. An overprint varnish of VINYLSTAR B-12 brand varnish (available from BASF Corporation), which incorporates CAP resin, was applied over a first portion of the printed side of the film using a #4 Myar rod. A second portion of the printed side of the film did not have any overprint varnish applied.

The printed side of the film sample was placed against an equivalent film sample that was not printed or coated with an overprint varnish. The resulting composite was subjected to sufficient pressure to simulate storage in a roll form. The films forming the composite were then separated. The Antifog Rating for the side of the unprinted film sample that had been compressed against the printed side of the corresponding printed film sample was determined, using the method for determining the Antifog Rating as discussed in the Antifog Film section above. The portion of the unprinted film that had been compressed against the first portion of the printed film that had the overprint varnish of a CAP resin had an Antifog Rating of 4—thus showing good retention of its antifog characteristics. The portion of the unprinted film that had been compressed against the second portion of the printed film that lacked the overprint varnish of a CAP resin had an Antifog Rating of 1—thus showing a significant deterioration of its antifog characteristics. A similar experiment was conducted substituting for the GRANADA WHITE brand ink a SUNSHRINK WHITE brand ink having an NC/PA resin—ending with the same results.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated.

What is claimed is:

1. A printed packaging film comprising:
    a plastic antifog film having first and second sides, at least the first side of the antifog film having an antifogging characteristic, wherein the antifog film comprises an antifog agent; and
    a printed image on at least a portion of the second side of the antifog film, the printed image comprising an ink comprising a resin comprising an effective amount of a cellulose acetate propionate, wherein the cellulose acetate propionate comprises an average propionyl content of from about 35 to about 55 weight %, an average acetyl content of from about 0.3 to about 3 weight %, and an average hydroxyl content of from about 1 to about 10%, based on the weight of the cellulose acetate propionate.

2. The printed packaging film of claim 1 wherein the antifog agent is selected from a fatty acid ester, a polyether, an ester of polyhydric aliphatic alcohol, an ethoxylate, a polyethoxylated fatty alcohol, a monoglyceride, a diglyceride, an ester of aliphatic alcohol, and a polyethoxylated aromatic alcohol.

3. The printed packaging film of claim 1 wherein the cellulose acetate propionate has a molecular weight of from about 10,000 to about 80,000.

4. The printed packaging film of claim 1 wherein the ink includes at least about 1% cellulose acetate propionate based on the total weight of the resin in the ink.

5. The printed packaging film of claim 1 wherein the printed film has a free shrink in at least one direction of at least about 5%, measured at 85° C. (ASTM D2732).

6. The printed packaging film of claim 1 wherein the printed film is in a rolled state placing the first and second sides in contact.

7. The printed packaging film of claim 1 further comprising a primer on the second side of the antifog film in a region approximately corresponding to the printed image.

8. The printed film of claim 1 wherein the antifog film comprises an antifog coating on the first side of the film, wherein the antifog coating comprises the antifog agent.

9. The printed film of claim 1 wherein the antifog film comprises the antifog agent dispersed in at least a portion of the film.

10. A packaged food product comprising:

a tray having a food storage side;

a food product resting on the food storage side of the tray; and the printed film of claim 1 covering at least the food storage side of the tray, wherein the first side of the film faces the food product.

11. A printed packaging film comprising:

a plastic antifog film having first and second sides, at least the first side of the antifog film having an antifogging characteristic, wherein the antifog film comprises an antifog agent;

a printed image on at least a portion of the second side of the antifog film; and an overprint varnish on at least a substantial portion of the printed image, the overprint varnish comprising a resin comprising an effective amount of a cellulose acetate propionate, wherein the cellulose acetate propionate comprises an average propionyl content of from about 35 to about 55 weight %, an average acetyl content of from about 0.3 to about 3 weight %, and an average hydroxyl content of from about 1 to about 10%, based on the weight of the cellulose acetate propionate.

12. The printed packaging film of claim 11 wherein the antifog agent is selected from a fatty acid ester, a polyether, an ester of polyhydric aliphatic alcohol, an ethoxylate, a polyethoxylated fatty alcohol, a monoglyceride, a diglyceride, an ester of aliphatic alcohol, and a polyethoxylated aromatic alcohol.

13. The printed packaging film of claim 11 wherein the cellulose acetate propionate has a molecular weight of from about 10,000 to about 80,000.

14. The printed packaging film of claim 11 wherein the overprint varnish includes at least about 1% cellulose acetate propionate based on the total weight of the resin in the overprint varnish.

15. The printed packaging film of claim 11 wherein the printed film has a free shrink in at least one direction of at least about 5%, measured at 85° C. (ASTM D2732).

16. The printed packaging film of claim 11 wherein the printed film is in a rolled state placing the first and second sides in contact.

17. The printed packaging film of claim 11 further comprising a primer on the second side of the antifog film.

18. The printed film of claim 11 wherein the antifog film comprises an antifog coating on the first side of the film, wherein the antifog coating comprises the antifog agent.

19. The printed film of claim 11 wherein the antifog film comprises the antifog agent dispersed in at least a portion of the film.

20. A packaged food product comprising:

a tray having a food storage side;

a food product resting on the food storage side of the tray; and a printed film covering at least the food storage side of the tray, wherein the first side of the film face the food product and the printed film comprises:

a plastic antifog film having first and second sides, as least the first side of the antifog film having an antifogging characteristic, wherein the antifog film comprises an antifog agent;

a printed image on at least a portion of the second side of the antifog film; and an overprint varnish on at least a substantial portion of the printed image, the overprint varnish comprising a resin comprising an effective amount of a cellulose acetate propionate, wherein the cellulose acetate propionate comprises an average propionyl content of from about 35 to about 55 weight %, an average acetyl content of from about 0.3 to about 3 weight %, and an average hydroxyl content of from about 1 to about 10%, based on the weight of the cellulose acetate propionate.

* * * * *